US005890271A

United States Patent [19]

Bromley et al.

[11] Patent Number: 5,890,271

[45] Date of Patent: Apr. 6, 1999

[54] INSERTION TOOL

[75] Inventors: David Bromley, Yardley, Pa.; Steven W Miccio, Bordentown, N.J.

[73] Assignee: Davco Packing and Seals, Inc., Yardley, Pa.

[21] Appl. No.: 903,128

[22] Filed: Jul. 30, 1997

[51] Int. Cl.[6] .......... B23P 19/04

[52] U.S. Cl. .......... 29/263; 29/255; 29/280

[58] Field of Search .......... 29/263, 255, 238, 29/235, 280, 282, 890.126, 430; 250/506.1

[56] References Cited

U.S. PATENT DOCUMENTS

| | | | |
|---|---|---|---|
| 2,424,681 | 7/1947 | Eberhart | 29/263 |
| 2,614,318 | 10/1952 | McCord | 29/263 |
| 3,611,540 | 10/1971 | Gibu | 29/263 |
| 3,862,483 | 1/1975 | Kloster | 29/263 |
| 4,092,546 | 5/1978 | Larrabee | 250/515 |
| 4,765,048 | 8/1988 | Hokanson | 29/263 |
| 5,090,102 | 2/1992 | Lovell | 29/255 |
| 5,400,500 | 3/1995 | Behnke et al. | 29/785 |

*Primary Examiner*—Timothy V. Eley
*Assistant Examiner*—Lee Wilson
*Attorney, Agent, or Firm*—Philip W. Humer

[57] ABSTRACT

A tool is described for inserting a compressible septum into a seat having a smaller inside diameter than the outside diameter of the uncompressed septum. The utilization of this insertion tool simplifies the insertion of the septum into the seat while avoiding contamination of the septum.

6 Claims, 5 Drawing Sheets

INSERTION TOOL

BACKGROUND OF THE INVENTION

1. Field of the Invention

The present invention is directed to the field of tools which insert a part into an opening that is smaller than the part being inserted into it. More specifically, it is directed to a tool which can insert a compressible septum into a seat which is smaller in inside diameter than the outside diameter of the septum being inserted in it while preventing contamination of the septum.

2. Description of the Prior Art

In many chemical and forensic laboratories an important analytical instrument is a chromatograph, for example, a gas liquid chromatograph (glc). These chromatographs are capable of separating mixtures of chemicals into their individual components, identifying the components of a mixture, and measuring the relative amounts of each component. In order to place a sample of a mixture into the chromatograph, a small amount of the sample is drawn into a microsyringe, the needle of which is then inserted through a rubber septum to inject the sample into the vaporization zone of the glc. Heretofore, the insertion of a septum into its seat while preparing the instrument to perform its analytical task has been quite difficult, usually requiring the individual installing the septum to hold the septum in a pair of tweezers while forcing it into the opening with a screw driver or some similar instrument. The difficulty of this operation stems from the fact that the diameter of the septum prior to being inserted in the seat is greater than the diameter of the seat. Because of the extreme sensitivity of a chromatograph, it is highly desirable to prevent any contact with human skin because this contact would contaminate the septum with oils and other impurities present on the skin and impair the accuracy of subsequent analyses. Currently such contact is almost inevitable because of the methods available for inserting septums into seats having a smaller diameter than the septum. There is no known tool to perform this operation in a way which avoids all possibility of contamination and which simplifies the insertion of the septum at the same time.

SUMMARY OF THE INVENTION

The present invention overcomes the possibility of contamination of the septum from handling and simplifies the insertion of it into its seat, reducing the time and work required to accomplish this insertion remarkably. It is the primary object of this invention to compress the septum, reducing its outside diameter to less than the inside diameter of the seat into which it is being placed without risking contamination from the hands of the person performing the insertion. A second object of this invention is to provide a means for removing the tool from the septum when the septum has been placed in its seat without either the possibility of contamination or withdrawing the septum with the tool. It is a further object of this invention to reduce the time and effort required to replace worn-out septums to a minimum by a method which is less complicated than the known methods of inserting septums currently being used.

BRIEF DESCRIPTION OF THE DRAWINGS

The invention will be described in detail, by way of example, with reference to the accompanying drawings in which.

DETAILED DESCRIPTION OF THE PREFERRED EMBODIMENTS

Figure 1:
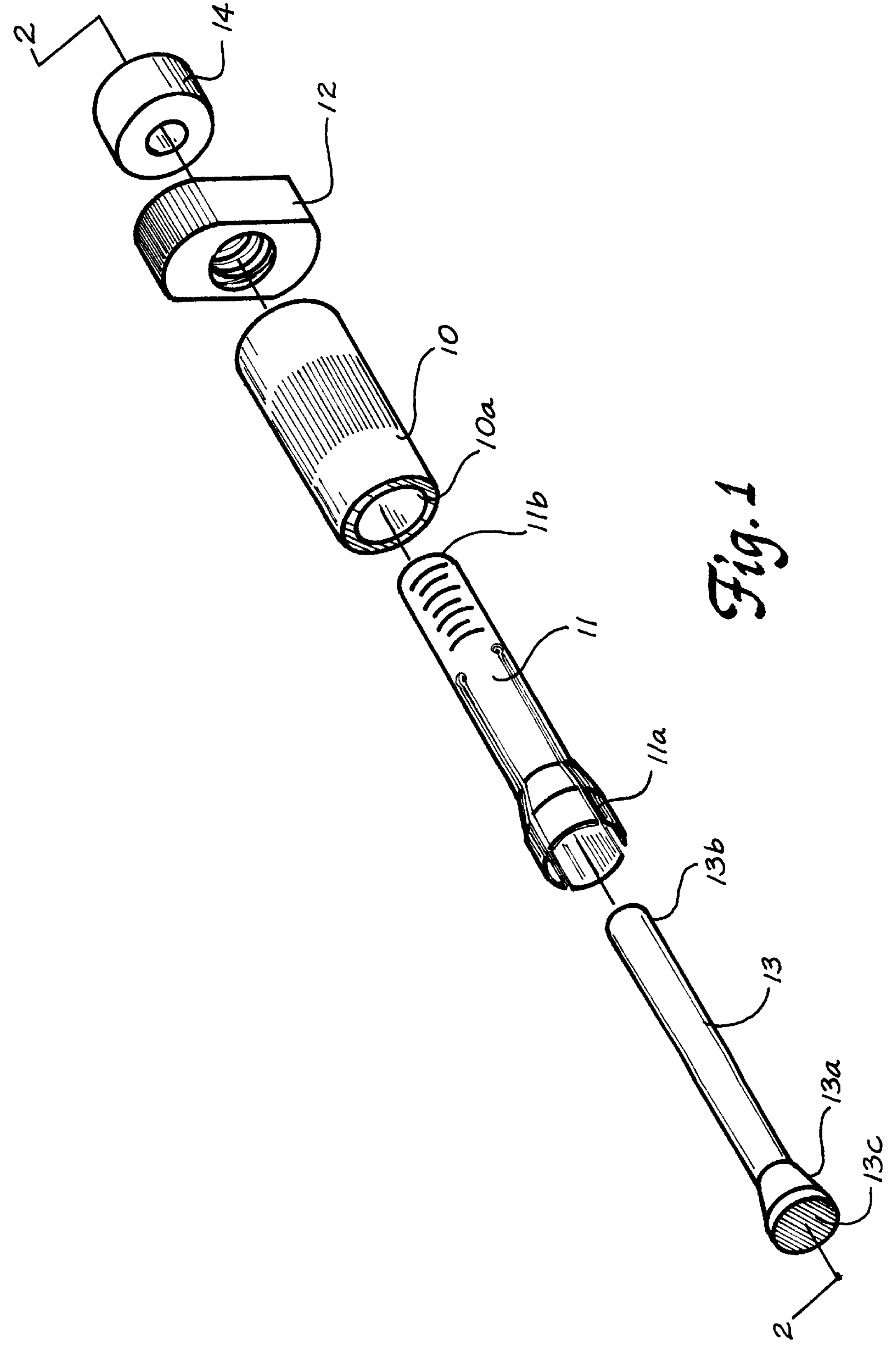
FIG. 1 is an exploded pictorial view of a simplified embodiment of the insertion tool.
Figure 2:
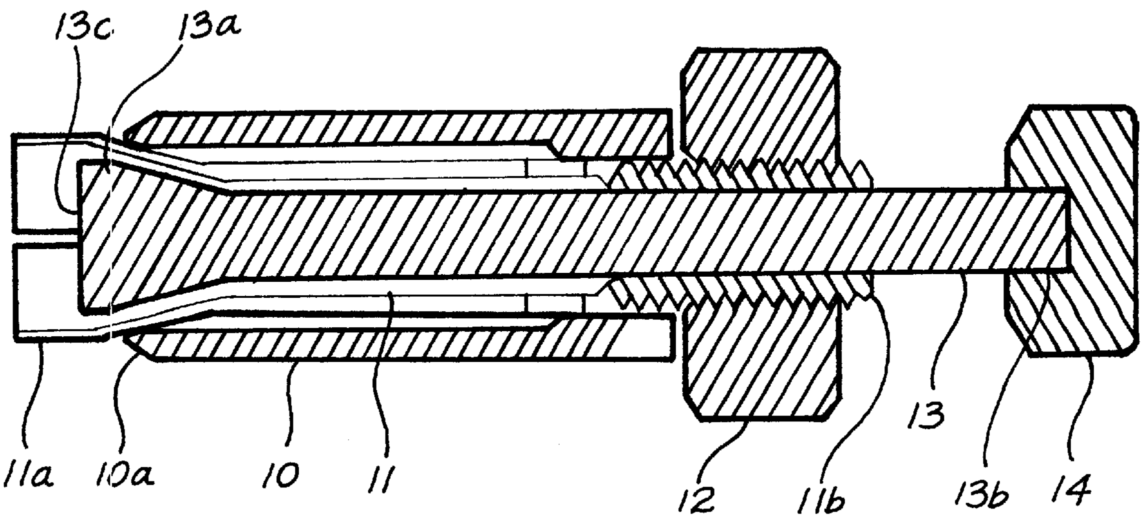
FIG. 2 is a cross sectional view along line 2—2 in FIG. 1 showing in detail the positions of the parts of the insertion tool and their relative sizes.

Referring to FIGS. 1 and 2 of the drawings and in accordance with the principles of the invention, a ferrule 10 is shown through which a collet 11 passes. Ferrule 10 is beveled slightly on its interior surface at open end 10*a* to ease the compression and decompression of the enlarged end 11*a* of collet 11 which has an inner diameter sufficient to easily grasp a septum before being compressed. Collet 11 is of sufficient length to pass completely through ferrule 10, exposing an enlarged end 11a and simultaneously exposing end 11*b*. Collet 11 is threaded on its exterior surface for approximately one-fourth to one-third of its length, starting at end 11*b*. A nut 12 is provided with interior complementary threads of the same pitch and number per inch to match the exterior threads of collet 11. When nut 12 is tightened on the threads of collet 11, it draws collet 11 into ferrule 10 and compresses the open end 11*a* of collet 11. Loosening nut 12 has the opposite effect, allowing end 11*a* of collet 11 to open to its greatest inside diameter. End 11*b* of collet 11 is provided with an opening of sufficient diameter to allow a plunger 13 to move easily through the opening along line 2—2. Plunger 13 is of sufficient length to simultaneously reach end 11*a* of collet 11 and beyond end 11*b* of collet 11, leaving sufficient length to attach a cap 14 to plunger 13. Plunger 13 is of uniform diameter except for end 13*a* which is expanded into a bell shape, providing a face 13*c*, said bell-shaped head at face 13*c* being nearly as large in outside diameter as the inside diameter of end 11*a* of collet 11 when end 11*a* is completely compressed. Face 13*c* of plunger 13 may either be flat or concave. End 13*b* of plunger 13 is fitted with a cap 14 which is provided for comfortable application of thumb pressure to plunger 13 during withdrawal of the tool from the septum and its seat while keeping the newly installed septum firmly in its seat. Cap 14 may be attached to plunger 13 by any suitable means, e.g., by a small screw, a force fit, or any other conventional and convenient means of attachment.

Figure 3:
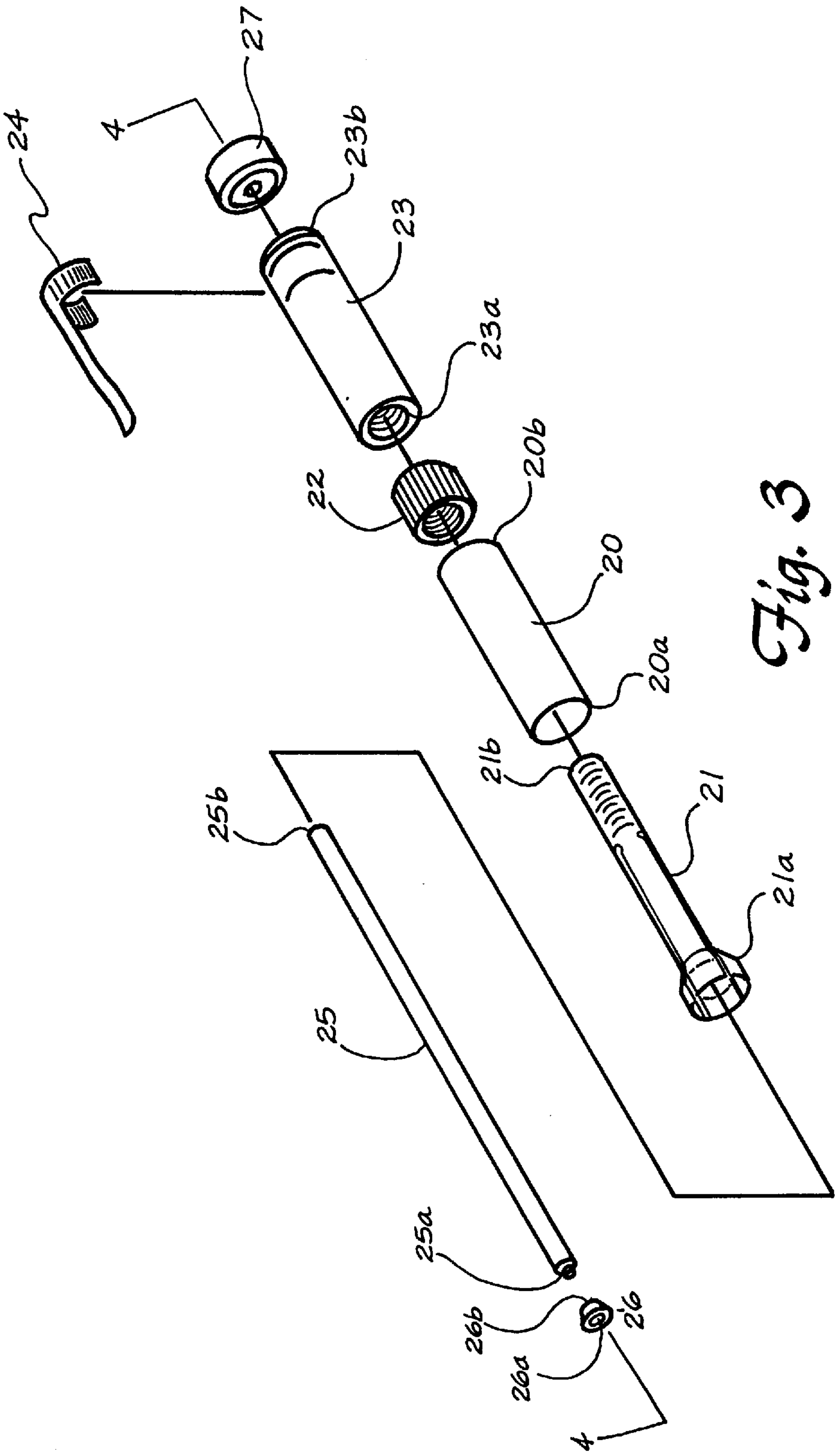
FIG. 3 is an exploded pictorial view of a second, more sophisticated embodiment of the insertion tool that could be commercially produced.
Figure 4:
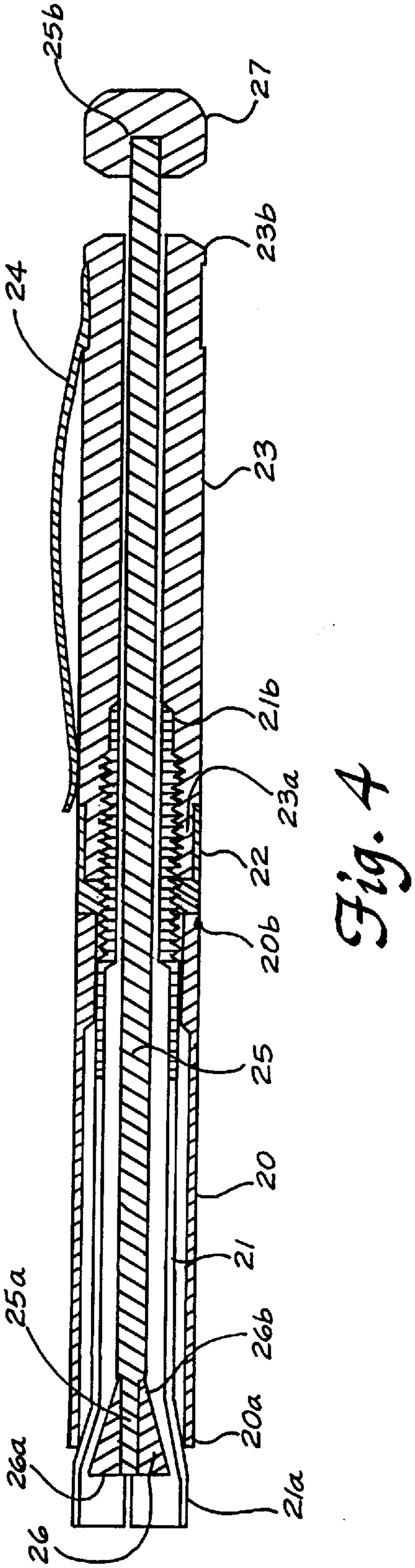
FIG. 4 is a cross sectional view along line 4—4 in FIG. 3 showing in detail the positions of the parts of the insertion tool and their relative sizes.

Referring to FIGS. 3 and 4 of the drawings and in accordance with the principles of the invention, a preferred embodiment is shown in which a ferrule 20 is shown through which a collet 21 passes. Ferrule 20 may be beveled slightly on its interior surface at end 20*a* to ease the compression and decompression of the enlarged end 21*a* of collet 21. End 21*a* of collet 21 is enlarged and, when it is decompressed, has an inside diameter sufficient for it to easily admit and grasp a septum having a slightly smaller outside diameter. Collet 21 is open at end 21*b*, the opening being of sufficient diameter to allow a rod 25 to move easily back and forth along line 4–4. Collet 21 is of sufficient length to pass completely through ferrule 20 while exposing end 21*a*, thus completely allowing end 21*a* to expand to its maximum inside diameter. Collet 21 must also be long enough to allow end 21*b* to be sufficiently exposed when end 21*a* is exposed and expanded to its largest possible inside diameter for both a collar 22 and a body 23 to be attached to collet 21. The exterior surface of collet 21 is threaded for approximately one-fourth to one-third of its length, beginning at end 21*b*. Optionally, up to one-half of said threads on the exterior surface of collet 21 closest to end 21*b* may be omitted. These threads may be either right hand or left hand threads to make the tool easily used by either right- or left-handed persons, although right hand threads are preferred because they are more commonly used. Collar 22, located adjacent to end 20*b* of ferrule 20 and having the same exterior diameter as ferrule 20, is threaded on its interior surface with complementary threads having the same pitch and number per inch as the threads on the exterior surface of collet 21 near end 21*b*. Collar 22 may be knurled on its exterior surface to ease turning the collar by hand. When collar 22 is threaded onto the complementary threads of collet 21, collet 21 is drawn into ferrule 20 compressing end 21*a*. Turning collar 22 in the opposite direction drives collet 21 through ferrule 20, allowing end 21*a* of collet 21 to expand to its largest inside diameter. A hollow body 23 having the same external diameter as ferrule 20 and collar 22 is threaded on its interior surface at end 23*a* with threads complementary to those on collet 21. Body 23 is threaded onto the exposed external threads of collet 21 remaining after collar 22 has been completely threaded onto collet 21. Optionally, the interior threads of body 23 may be omitted, provided a portion of the threads on the exterior surface of collet 21 have been omitted as described above, and body 23 may be force-fit onto end 21*b* of collet 21 to permanently attach body 23 to collet 21. Body 23 may be also permanently attached to collet 21 by other means, such as an adhesive, a weld, solder or any other convenient means to prevent the tool from disassembling during use. Near end 23*b* of body 23 there may be provided a clip 24 attached to the exterior surface of body 23 for the purpose of fastening the tool in a pocket, for example, a shirt pocket, to have quick access to the tool when it is needed. A rod 25 passes completely through collet 21 and body 23 extending beyond end 23*b* of body 23. A cap 27 is attached to end 25*b* of rod 25 by means of a screw, a force fit, a weld, or similar means. End 25*a* of rod 25 has a reduced outside diameter which may optionally be threaded. A bell-shaped head 26 is attached to end 25*a* of rod 25. Head 26 has a female opening 26*b* complementary to the reduced diameter of end 25*a* of rod 25 in order to connect the two parts. If end 25*a* is threaded, then female opening 26*b* of head 26 must have complementary threads on its interior surface to attach head 26 to rod 25. Alternatively, the attachment of head 26 to rod 25 may be by any appropriate means such as a force fit, a weld, a soldered joint, and the like. Face 26*a* of head 26 is flat and has a outside diameter only slight less than the inside diameter of enlarged end 21*a* of collet 21 when collet 21 is fully compressed. Optionally, face 26*a* may be concave rather than flat. Taken together, head 26, rod 25, and cap 27 comprise a plunger when said parts are permanently joined together.

Figure 8:
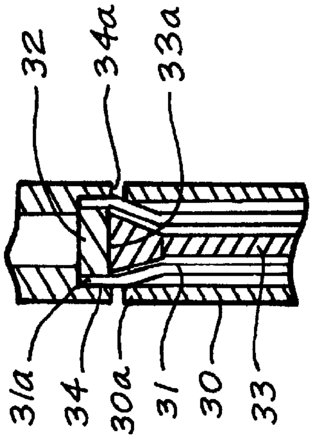
FIGS. 5 through 9 show the sequential steps of picking up a septum in the insertion tool, compressing the septum by the tool, placing the septum and the tool into the seat in which the septum is to be inserted, withdrawing the collet of the tool from the septum, and removing the tool while holding the septum in place with the plunger.
Figure 5:
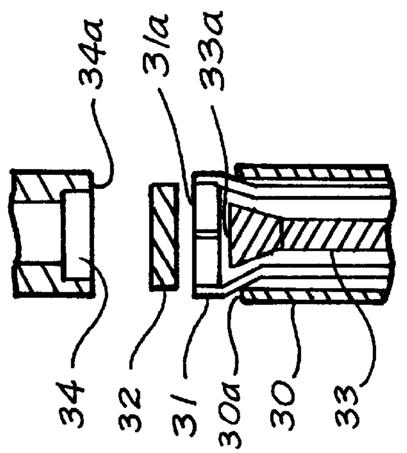
Figure 9:
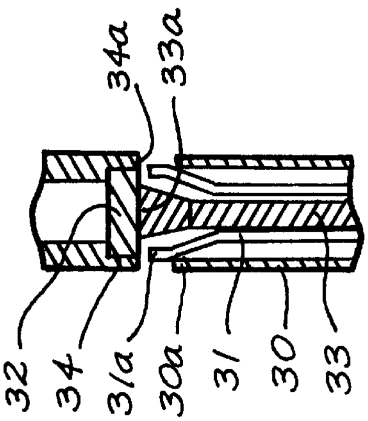
Figure 6:
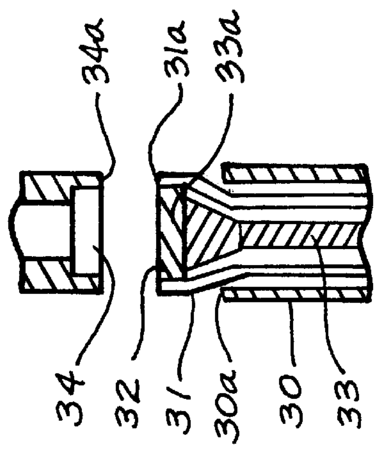
Figure 7:
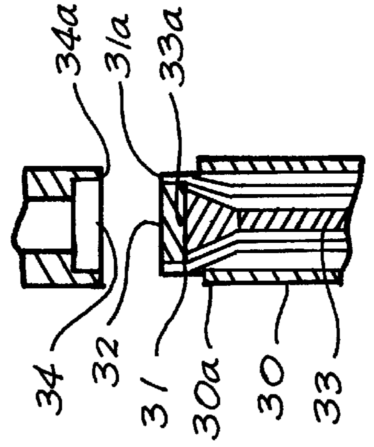

Referring to FIGS. 5 through 9, the sequence of steps required to pick up a septum in the tool, compress it, insert it into the seat of a chromatograph, and withdraw the tool without withdrawing the septum from the seat are depicted. Compression of the septum means that its outside diameter is reduced sufficiently to be less than the inside diameter of the seat into which it is being inserted. During this compression the septum may change shape and its flat surfaces may become convex; however, since the septum is made of an elastomer, when the pressure compressing it is released, it will return to its original shape, including having flat faces. In FIG. 5 a collet 31 is extended beyond end 30*a* of a ferrule 30, thus allowing end 31*a* of collet 31 to open to its maximum inside diameter. The maximum inside diameter of collet 31 is slightly larger than the outside diameter of a septum 32 to insure that the collet 31 will easily accommodate the septum in its open end 31*a*. A new, uncontaminated septum 32 is available for insertion into a chromatograph seat 34. The outside diameter of septum 32 is greater than the inside diameter of seat 34. In FIG. 6 collet 31 has been placed over septum 32 completely surrounding it. No compression of collet 31 has occurred at this time. In FIG. 7 collet 31 has been drawn into ferrule 30, thus compressing enlarged end 31*a* of collet 31 and simultaneously compressing septum 32 so that the outside diameter of collet 31 at end 31*a* is less than the inside diameter of seat 34. Surface 34*a* surrounds seat 34. In FIG. 8 the compression of collet 31 and septum 32 is maintained while the tool containing the compressed septum is placed in seat 34 below surface 34*a* of the seat. In FIG. 9 collet 31 is withdrawn from both septum 32 and seat 34 to a point above surface 34*a*, releasing the compression on septum 32. During this operation, face 33*a* of plunger 33 is held firmly against the surface of septum 32, holding septum 32 securely in seat 34 of the chromatograph. Pressure is maintained on plunger 33 while collet 31 is withdrawn from seat 34. Upon removal of collet 31 from seat 34, septum 32 expands to the diameter of seat 34, filling seat 34 completely. At this point plunger 33 can be removed leaving septum 32 in seat 34. The pressure applied to the end of plunger 33 opposite end 33*a* is applied by holding the insertion tool in a person's hand and pressing on the plunger with the thumb. This action is sufficient to withdraw collet 31 from both septum 32 and seat 34 while holding septum 32 in the chromatograph seat 34 below surface 34*a*. By means of the above-described procedure, septum 32 has been installed in seat 34 without becoming contaminated by contact with human skin and with an ease never before achieved.

The inside diameter of the enlarged end of a collet used in the insertion tool of this invention should be slightly larger than the outside diameter of the uncompressed septum to allow the collet to be slipped over the septum without contact with human skin. Septums are made in different diameters to fit in seats having different diameters. Accordingly, collets having different inside diameters may be required to insert septums having different outside diameters.

While preferred embodiments of the invention are described, it will be understood that the invention is in no way limited by these embodiments.

We claim:

1. An insertion tool comprising:

a. a collet for holding and compressing a septum, said collet having an enlarged compressible end that is provided to hold a septum, said collet being open at opposite ends and having threads on the external surface at the end opposite from said enlarged compressible end, said enlarged compressible end having an uncompressed internal diameter slightly exceeding the outside diameter of an uncompressed septum, the outside diameter of said enlarged compressible end being less than the inside diameter of the seat into which the septum is to be inserted when the said enlarged compressible end is compressed;

b. a ferrule through which said collet passes, said ferrule being of a length to allow both ends of said collet to extend beyond the ferrule simultaneously, said ferrule being optionally beveled on its interior surface of the end of said ferrule which contacts said enlarged compressible end of said collet;

c. a nut, said nut having threads on its inner surface complementary to said threads on the external surface of said collet, said nut, when threaded on said collet, being used to compress and decompress said collet;

d. a plunger, said plunger passing through said collet and having sufficient length to extend beyond said collet, said plunger having a bell-shaped head at the end within said enlarged compressible end of said collet, said bell shaped end having a flat face having a diameter slightly smaller than the compressed inside diameter of said enlarged compressible end of said collet; and e. a cap attached to the end of said plunger distant from said bell shaped-head.

2. The insertion tool of claim 1 in which said bell-shaped head of said plunger has a concave surface.

3. An insertion tool comprising:

a. a collet for holding and compressing a septum, said collet having an enlarged compressible end that is provided to hold a septum, said collet having open ends at opposite ends and threads on the external surface at the end distant from said enlarged, compressible end, optionally, a portion of said threads being omitted from the external surface of said collet at said end most distant from said enlarged compressible end of said collet, said enlarged compressible end having an uncompressed inside diameter slightly exceeding the outside diameter of an uncompressed septum, said outside diameter of said enlarged compressible end being less than the inside diameter of a seat into which said septum is to be inserted when the said compressible end is compressed;

b. a ferrule through which said collet passes, said ferrule being of a length to allow both ends of said collet to extend beyond the ferrule simultaneously, said ferrule being optionally beveled on its interior surface at its end which contacts said enlarged compressible end of said collet;

c. a collar, said collar having threads on its interior surface complementary to those on the external surface of said collet, said threads being either right hand or left hand threads, said collar, when threaded on said collet, being used to compress and decompress said collet, said collar having an outside diameter the same as the outside diameter of said ferrule, and, optionally, said collar being knurled on its exterior surface;

d. a hollow body, said body having an outside diameter the same as the external diameter of said ferrule and said collar, said body having threads on its interior surface complementary to those on the exterior surface of said collet, said body being threaded onto said collet, the attachment of said body to said collet being permanent;

e. a rod, said rod passing completely through said collet and said body, said rod having sufficient length to extend beyond said body, said rod having a reduced diameter at its end coincident with said enlarged compressible end of said collet, said reduced diameter end of said rod optionally being threaded;

f. a bell-shaped head, said bell-shaped head having a flat surface the outside diameter of which is slightly smaller than the inside diameter of said enlarged compressible end of said collet when said enlarged compressible end is compressed, said bell-shaped head having on the end opposite said flat face a female opening complementary to said reduced diameter end of said rod whereby said bell-shaped head and said rod are permanently joined, said female opening optionally having threads complementary to those on said reduced diameter end of said rod when said threads are present on said rod; and g. a cap permanently attached to the end of said rod distant from the end of said rod to which said bell-shaped head is attached, said bell shaped head, said rod, and said cap when permanently joined comprising a plunger.

4. The insertion tool of claim 3 in which a clip is attached to the exterior surface of said body near the end most distant from said enlarged compressible end of said collet.

5. The insertion tool of claim 3 in which said bell-shaped head has a concave surface.

6. An insertion tool of claim 3 in which a portion of said threads on the exterior surface of said collet are omitted at the end of said collet distant from said enlarged compressible end of said collet and said threads on the interior surface of said body are omitted to permit said body to be attached permanently to said collet by means of a force fit, solder, a weld, or an adhesive.

* * * * *